United States Patent
Wang et al.

(10) Patent No.: US 12,480,857 B2
(45) Date of Patent: Nov. 25, 2025

(54) METHODS AND RELATED ASPECTS OF RAPID MICROBIAL DETECTION USING INTRINSIC FEATURE TRACKING

(71) Applicant: ARIZONA BOARD OF REGENTS ON BEHALF OF ARIZONA STATE UNIVERSITY, Scottsdale, AZ (US)

(72) Inventors: Shaopeng Wang, Chandler, AZ (US); Fenni Zhang, Tempe, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 0 days.

(21) Appl. No.: 18/055,033

(22) Filed: Nov. 14, 2022

(65) Prior Publication Data

US 2025/0012697 A1    Jan. 9, 2025

Related U.S. Application Data

(60) Provisional application No. 63/280,406, filed on Nov. 17, 2021.

(51) Int. Cl.
| | |
|---|---|
| G06K 9/00 | (2022.01) |
| G01N 15/01 | (2024.01) |
| G01N 15/0205 | (2024.01) |
| G01N 15/0227 | (2024.01) |
| G06V 10/774 | (2022.01) |
| G06V 20/69 | (2022.01) |
| G16H 10/40 | (2018.01) |

(52) U.S. Cl.
CPC ......... *G01N 15/0211* (2013.01); *G01N 15/01* (2024.01); *G01N 15/0227* (2013.01); *G06V 10/774* (2022.01); *G06V 20/695* (2022.01); *G06V 20/698* (2022.01); *G16H 10/40* (2018.01)

(58) Field of Classification Search
None
See application file for complete search history.

(56) References Cited

U.S. PATENT DOCUMENTS

| | | | |
|---|---|---|---|
| 2012/0169863 A1* | 7/2012 | Bachelet | G01N 21/5907 348/79 |
| 2021/0398296 A1* | 12/2021 | Fang | G06T 7/215 |

OTHER PUBLICATIONS

Kun et al., "The use of motion analysis as particle biomarkers in lensless optofluidic projection imaging for point of care urine analysis" (Year: 2019).*
Solomon et al., Antibiotic resistance threats in the United States: stepping back from the brink, Am Fam Physician 2014, 89 (12), pp. 938-941.
Griebling, Urologic Diseases in America Project: Trends in Resource Use for Urinary Tract Infections in Men, The Journal of Urology, vol. 173, Apr. 2005, pp. 1288-1294.
Griebling, Urologic Diseases in American Project: Trends in Resource Use for Urinary Tract Infections in Wormen, The Journal of Urology, vol. 173, Apr. 2005, pp. 1281-1287.

(Continued)

*Primary Examiner* — Sj Park
(74) *Attorney, Agent, or Firm* — MH2 Technology Law Group, LLP

(57) ABSTRACT

Provided herein is a method of detecting microorganisms in liquid samples using image features, such as time profiles of object light scattering intensity and time profiles of object position. Related methods, devices, systems, and other aspects are also provided.

19 Claims, 9 Drawing Sheets

(56) References Cited

OTHER PUBLICATIONS

Foxman, The epidemiology of urinary tract infection, Nature Reviews Urology, Dec. 2010, vol. 7, Issue 12, pp. 653-660.

Author Unknown, The antibiotic alarm, Nature 2013, 495 (7440), p. 141.

Gross, Antibiotics in crisis, Curr Biol 2013, 23 (24), R1063-5, 3 pages.

Van Boeckel et al., Global antibiotic consumption 2000 to 2010: an analysis of national pharmaceutical sales data, Lancet Infect Dis 2014, 14 (8), pp. 742-750.

Liu et al., Clinical Practice Guidelines by the Infectious Diseases Society of America for the Treatment of Methicillin-Resistant *Staphylococcus aureus* Infections in Adults and Children, Clinical Infectious Diseases, vol. 52, Issue 3, Feb. 1, 2011, pp. e18-e55.

Mammina, The global crisis of multidrug resistance: how to face healthcare associated infections without effective antibiotics?, Iran J Microbiol 2013, 5 (2), pp. 99-101.

Davenport, M.; Mach, K. E.; Shortliffe, L. M. D.; Banaei, N.; Wang, T. H.; Liao, J. C., New and developing diagnostic technologies for urinary tract infections. Nat Rev Urol 2017, 14 (5), 296-310.

Kshikhundo, Bacterial species identification, World News of Natural Sciences 2016, 3, pp. 26-38.

Mori et al., Diagnostic performance of urine dipstick testing in children with suspected UTI: a systematic review of relationship with age and comparison with microscopy, Acta Paediatrica, 2010, 99, pp. 581-584.

Whiting et al., Rapid tests and urine sampling techniques for the diagnosis of urinary tract infection (UTI) in children under five years: a systematic review, BMC Pediatr 2005, 5 (1): 4, 14 pages.

Vazouras et al., Antibiotic treatment and antimicrobial resistance in children with urinary tract infections, J Glob Antimicrob Resist 2020, 20, 4-10, 7 pages.

Wilson et al., Laboratory Diagnosis of Urinary Tract Infections in Adult Patients, Medical Microbiology, CID Apr. 15, 2004:38, pp. 1150-1158.

Shayanfar et al., Automated urinalysis: first experiences and a comparison between the Iris iQ200 urine microscopy system, the Sysmex UF-100 flow cytometer and manual microscopic particle counting, Clin Chem Lab Med 2007;45 (9), pp. 1251-1256.

Van Den Broek et al., Benefits of the iQ200 automated urine microscopy analyser in routine urinalysis, Clin Chem Lab Med, 2008, 46(11), pp. 1635-1640.

Kaleta et al., Comparative analysis of PCR-electrospray ionization/mass spectrometry (MS) and MALDI-TOF/MS for the identification of bacteria and yeast from positive blood culture bottles, Clin Chem 2011, 57 (7), pp. 1057-1067.

Dark et al., Bench-to-bedside review: the promise of rapid infection diagnosis during sepsis using polymerase chain reaction-based pathogen detection, Crit Care 2009, 13 (4), 6 pages.

Niemz et al., Point-of-care nucleic acid testing for infectious diseases, Trends Biotechnol 2011, 29 (5), pp. 240-250.

Rosch et al., Chemotaxonomic identification of single bacteria by micro-Raman spectroscopy: application to clean-room-relevant biological contaminations, Appl Environ Microbiol 2005, 71 (3), pp. 1626-1637.

Jo et al., Label-free identification of individual bacteria using Fourier transform light scattering, Opt. Express 2015, 23 (12), pp. 15792-15805.

He et al., Rapid bacteria identification using structured illumination microscopy and machine learning, Journal of Innovative Optical Health Sciences 2017, 11 (01), 1850007, 10 pages.

Quinn et al., Deep Convolutional Neural Networks for Microscopy-Based Point of Care Diagnostics, Proceedings of the 1st Machine Learning for Healthcare Conference, PMLR: 2016; pp. 271-281.

Liang et al., An End-to-End System for Automatic Urinary Particle Recognition with Convolutional Neural Network, J Med Syst, 2018, 42:165, 14 pages.

Hay et al., Performance of convolutional neural networks for identification of bacteria in 3D microscopy datasets, Plos Comput Biol 2018, 14 (12), e1006628, 17 pages.

Cho et al., How much data is needed to train a medical image deep learning system to achieve necessary high accuracy?, arXiv.org 2015, 10 pages.

Cong et al., Single particle analysis at high resolution, Methods Enzymol 2010, 482, pp. 211-235.

Yang et al., Label-Free Tracking of Single Organelle Transportation in Cells with Nanometer Precision Using a Plasmonic Imaging Technique, Small (Weinheim an der Bergstrasse, Germany) 2015, 11 (24), pp. 2878-2884.

Taute et al., High-throughput 3D tracking of bacteria on a standard phase contrast microscope, Nat Commun 2015, 6, 8776, 9 pages.

Qian et al., Single particle tracking Analysis of diffusion and flow in two-dimensional systems, Biophys J 1991, 60 (4), pp. 910-921.

Adan et al., Flow cytometry: basic principles and applications, Crit Rev Biotechnol 2017, 37 (2), pp. 163-176.

Babick, Dynamic light scattering (DLS), Characterization of Nanoparticles, 2020, Elsevier, pp. 137-172.

Yoon et al., A simple and rapid method for detecting living microorganisms in food using laser speckle decorrelation, arXiv:1603.07343, 2016, 6 pages.

Hunt et al., Label-free biological and chemical sensors, Nanoscale, 2010, 2, pp. 1544-1559.

Freudiger et al., Label-Free Biomedical Imaging with High Sensitivity by Stimulated Raman Scattering Microscopy, Science 2008, 322, pp. 1857-1861.

Mo et al., Rapid Antimicrobial Susceptibility Testing of Patient Urine Samples Using Large Volume Free-Solution Light Scattering Microscopy, Anal Chem 2019, 91 (15), pp. 10164-10171.

Zhang et al., Direct Antimicrobial Susceptibility Testing on Clinical Urine Samples by Optical Tracking of Single Cell Division Events, Small (Weinheim an der Bergstrasse, Germany) 2020, n/a (n/a), 2004148, 18 pages.

Zhang et al., Rapid Antimicrobial Susceptibility Testing on Clinical Urine Samples by Video-Based Object Scattering Intensity Detection, Anal Chem 2021, 93 (18), pp. 7011-7021.

Broeren et al., Screening for urinary tract infection with the Sysmex UF-1000i urine flow cytometer, J Clin Microbiol 2011, 49 (3), pp. 1025-1029.

Fouchet et al., Recent advances of flow cytometry in fundamental and applied microbiology, Biol Cell, 1993, 78, pp. 95-109.

Steen, Light scattering measurement in an arc lamp-based flow cytometer, Cytometry 1990, 11 (2), pp. 223-230.

Jo et al., Angle-resolved light scattering of individual rod-shaped bacteria based on Fourier transform light scattering, Sci Rep 2014, 4, 5090, 6 pages.

Pottash et al., TumbleScore: Run and tumble analysis for low frame-rate motility videos, BioTechniques 2017, 62 (1), pp. 31-36.

Morters et al., Brownian Motion. Cambridge University Press: Cambridge, 2010, 403 pages.

Lane et al., Expression of flagella is coincident with uropathogenic *Escherichia coli* ascension to the upper urinary tract, Proc Natl Acad Sci U S A, Oct. 16, 2007, 104(42), pp. 16669-16674.

Darnton et al., On torque and tumbling in swimming *Escherichia coli*, J Bacteriol 2007, 189 (5), pp. 1756-1764.

Winters-Hilt et al., SVM clustering, BMC Bioinformatics 2007, 8 Suppl 7, S18, 12 pages.

Burd et al., A Critical Appraisal of the Role of the Clinical Microbiology Laboratory in the Diagnosis of Urinary Tract Infections, J Clin Microbiol., Sep. 2011, 49 (9_Supplement), pp. S34-S38.

Tinevez et al., TrackMate: An open and extensible platform for single-particle tracking, Methods 2017, 115, pp. 80-90.

* cited by examiner

METHODS AND RELATED ASPECTS OF RAPID MICROBIAL DETECTION USING INTRINSIC FEATURE TRACKING

CROSS-REFERENCE TO RELATED APPLICATIONS

This application claims priority to U.S. Provisional Patent Application Ser. No. 63/280,406, filed Nov. 17, 2021, the disclosure of which is incorporated herein by reference.

STATEMENT REGARDING FEDERALLY SPONSORED RESEARCH OR DEVELOPMENT

This invention was made with government support under grant R01 AI138993 awarded by the National Institutes of Health. The government has certain rights in the invention.

BACKGROUND

Every year, over 2.8 million people suffer bacterial infections in the United States, leading to approximately 223,900 hospital admissions and 35,000 deaths. Urinary tract infections (UTI) are the third most common type of bacterial infection (after respiratory and gastrointestinal infections), affecting half of the population during their lifetime and accounting for considerable morbidity and healthcare expenditure with an estimated annual cost of ~$3.5 billion in US. Although many UTIs are uncomplicated, they can develop into life-threatening infections, such as sepsis, particularly with the rising incidence of antimicrobial resistance to commonly used antibiotics. The problem of antimicrobial resistance is aggravated by the overuse and misuse of antibiotics in healthcare facilities, as current diagnostic timelines often necessitate empirical treatments. The pathogens responsible for UTIs pose a high threat of developing antimicrobial resistance, and thus are targets for the advancement of rapid diagnostic methods.

Standard diagnostic methods for bacterial identification and antibiotic susceptibility testing (AST) are lab-based and typically take 2-4 days for results to be reported to the patient. Rapid point-of-care (POC) bacterial infection detection methods are necessary to avoid empirical prescription of antimicrobials for non-bacterial infections and conserve laboratory resources for complicated cases by reducing clinical sample loads. Traditionally, to identify bacteria at a species/strain level, they are isolated, purified, and identified with a series of observations of cellular and colony morphology along with biochemical tests. While faster UTI screening methods like dipstick tests and manual microscopy are available, they are less reliable than the standard culture-based methods that require 24 hours or more to produce results. For high throughput analysis, automated devices based on light scattering analysis or particle imaging recognition show lower sensitivity rates (30-70%) than manual microscopy or culturing for bacterial identification. Modern methods, including Polymerase Chain Reaction (PCR) and Matrix Assisted Laser Desorption Ionization Time-Of-Flight Mass Spectrometry, also require culture-based enrichment and isolation. To bypass bacterial culturing, attempts have been made to identify pathogens using real-time PCR, Raman scattering, and imaging methods based on machine and deep learning. However, these methods have their limitations: real-time PCR is expensive, Raman scattering has limited throughput, and traditional machine learning and deep learning-based techniques require extensive datasets for robust generalization capacities and are currently limited to a small number of species and cases.

Single particle analysis is important in characterizing particle analytes, including single cells. To fully characterize particles and increase specificity, multi-parameter detection and tracking of particles at single particle resolution is often preferred. Using light scattering imaging, one can obtain the trajectory of particles by capturing and recording the scattering intensity and temporal information of particles. The analysis of small particle trajectories at high spatial and temporal resolution is a powerful tool that characterizes the mechanisms of particle motion in living cells and other systems. Many existing single cell analysis methods rely on extrinsic markers, biochemical labels that target specific molecules on or in cells, such as fluorochromes, quantum dots, magnetic beads, and stable isotopes. However, labeling requires additional sample processing and usually affects cell viability and downstream analysis. Cells possess intrinsic features, including size, shape, density, optical, mechanical, and electrical properties, that are detectable without the need for labeling. These intrinsic cellular features function as markers and allow for label-free analysis that can be universally applied to all cells.

Accordingly, there is a need for methods and related aspects of detecting microorganisms that involve the use of intrinsic features of those organisms.

SUMMARY

The present disclosure relates, in certain aspects, to methods of detecting microorganisms in a liquid sample using intrinsic features of those organisms. In some embodiments, the methods are used to detect urinary tract infections in urine samples. In some implementations, samples are uncultured prior to analysis. Typically, the methods provide rapid sample-to-answer turn-around times of about 10 minutes or less using related point-of-care devices. These and other aspects will be apparent upon a complete review of the present disclosure, including the accompanying figures.

In one aspect, the present disclosure provides a method of detecting a target microorganism in a liquid sample using a computer. The method includes extracting, by the computer, two or more image features for each of a plurality of objects in the liquid sample from a set of imaging data that comprises multiple images of the liquid sample generated at different time points, which image features comprise at least a time profile of object light scattering intensity and at least a time profile of object position to produce a set of extracted image feature data. The method also includes identifying, by the computer, one or more patterns in the set of extracted image feature data to produce one or more sets of identified patterns. In addition, the method also includes differentiating, by the computer, at least one microorganism from other objects in the plurality of objects in the liquid sample based upon the one or more sets of identified patterns, thereby detecting the target microorganism in the liquid sample.

In one aspect, the present disclosure provides a method of treating an infectious disease in a subject. The method includes extracting, by a computer, two or more image features for each of a plurality of objects in a liquid sample obtained from the subject from a set of imaging data that comprises multiple images of the liquid sample generated at different time points, which image features comprise at least a time profile of object light scattering intensity and at least a time profile of object position to produce a set of extracted image feature data. The method also includes identifying, by the computer, one or more patterns in the set of extracted image feature data to produce one or more sets of identified patterns. In addition, the method also includes differentiating, by the computer, at least one pathogenic microorganism indicative of the disease in the subject from other objects in the plurality of objects in the liquid sample based upon the one or more sets of identified patterns using a trained classifier. The method also includes administering one or more therapies to the subject to treat the disease.

In one aspect, the present disclosure provides a method of generating a trained classifier using a computer. The method includes extracting, by the computer, two or more image features for each of a plurality of objects in a plurality of reference liquid samples that comprise a target microorganism from sets of imaging data that comprise multiple images of each of the plurality of reference liquid samples generated at different time points, which image features comprise at least a time profile of object light scattering intensity and at least a time profile of object position to produce a set of extracted image feature data. The method also includes identifying, by the computer, one or more patterns in the set of extracted image feature data to produce one or more sets of identified patterns. In addition, the method also includes training, by the computer, a machine learning algorithm using at least a portion of the sets of identified patterns to create at least one trained classifier that is configured to classify one or more test liquid samples as comprising the target microorganism, thereby generating the trained classifier.

In some embodiments, the method further includes determining a tracking trajectory of each of the plurality of objects in the liquid sample from the set of imaging data that comprises the multiple images of the liquid sample generated at the different time points to produce a set of tracking trajectory data and extracting the image features for each of the plurality of objects in the liquid sample from the set of tracking trajectory data to produce the set of extracted image feature data.

In some embodiments, the method further includes generating the set of imaging data that comprises the multiple images of the liquid sample using an imaging apparatus. In some embodiments, a large volume solution scattering imaging (LVSi) system comprises the imaging apparatus. In some embodiments, the multiple images of the liquid sample generated at the different time points are magnified about 5 or fewer times. In some embodiments, a video (e.g., time-lapsed) comprises the multiple images of the liquid sample generated at the different time points. In some embodiments, the video is about 30 seconds or less in duration. In some embodiments, the time profile of object light scattering intensity comprises a map of light scattering intensity fluctuation of a given object in the plurality of objects. In some embodiments, the time profile of object position comprises a map of movement of a given object in the plurality of objects along at least one axis.

In some embodiments, the method includes correlating the time profile of object light scattering intensity and the time profile of object position of a given object in the plurality of objects with one or more intrinsic features of the given object in the plurality of objects. In some embodiments, the method includes the intrinsic features comprise one or more phenotypic features of the given object in the plurality of objects. In some embodiments, the method includes the intrinsic features comprise one or more of: object size, object shape, and object motion. In some embodiments, the method includes using the intrinsic features of the given object in the plurality of objects to differentiate the target microorganism from the other objects in the plurality of objects.

In some embodiments, the method includes identifying the patterns in the set of extracted image feature data and/or differentiating the target microorganism from the other objects in the plurality of objects using normalized intensity standard deviation (NISD) and mean square displacement (MSD) values generated from the set of extracted image feature data. In some embodiments, the method includes using a threshold value to differentiate the target microorganism from the other objects in the plurality of objects in the liquid sample based upon the one or more sets of identified patterns. In some embodiments, the method includes determining the threshold value using a ratio of a number of the target microorganisms in the liquid sample to a total number of objects in the plurality of objects in the liquid sample ($N_{Target}/N_{Total}$) as a predictor.

In some embodiments, the threshold value comprises an infection threshold. In some embodiments, the target microorganisms comprise pathogenic microorganisms and the threshold value comprises an infection threshold value. In some embodiments, the method includes differentiating the target microorganism from other objects in the plurality of objects in the liquid sample based upon the one or more sets of identified patterns using a trained classifier.

In some embodiments, the method includes generating a trained classifier using multiple liquid samples. In some embodiments, the method includes adjusting the set of image data to reduce background noise and/or image drift prior to extracting the image features for each of the plurality of objects in the liquid sample from the set of imaging data. In some embodiments, the method includes obtaining the liquid sample from a subject. In some embodiments, the liquid sample obtained from the subject is uncultured prior to extracting the image features for each of the plurality of objects in the liquid sample from the set of imaging data. In some embodiments, the method includes differentiating the target microorganism from other objects in the plurality of objects in the liquid sample within about 10 minutes of obtaining the liquid sample from the subject. In some embodiments, the method includes differentiating the target microorganism from other objects in the plurality of objects in the liquid sample indicates that the subject has a disease. In some embodiments, the liquid sample is urine and the disease comprises a urinary tract infection (UTI). In some embodiments, the method includes administering one or more therapies to the subject to treat the disease. In some embodiments, the liquid sample comprises a sample type selected from the group consisting of: blood, plasma, cerebrospinal fluid (CSF), sputum, saliva, semen, cervical fluid, vaginal fluid, or urine.

In one aspect, the present disclosure provides an imaging device that includes at least one light source; at least one liquid sample analysis area in communication with the light source; at least one camera in communication with the liquid sample analysis area; at least one controller operably connected at least to the light source and the camera, which controller comprises, or is capable of accessing, computer readable media comprising non-transitory computer executable instructions which, when executed by at least one electronic processor, perform at least: extracting two or more image features for each of a plurality of objects in a liquid sample from a set of imaging data that comprises multiple images of the liquid sample generated at different time points, which image features comprise at least a time profile of object light scattering intensity and at least a time profile of object position to produce a set of extracted image feature data; identifying one or more patterns in the set of extracted image feature data to produce one or more sets of identified patterns; and differentiating at least one pathogenic microorganism indicative of a disease in a subject from other objects in the plurality of objects in the liquid sample based upon the one or more sets of identified patterns using a trained classifier. In some embodiments, a point-of-care device includes the imaging device. In some embodiments, a system includes the imaging device.

In one aspect, the present disclosure provides a computer readable media comprising non-transitory computer executable instruction which, when executed by an electronic processor, perform at least: extracting two or more image features for each of a plurality of objects in a liquid sample from a set of imaging data that comprises multiple images of the liquid sample generated at different time points, which image features comprise at least a time profile of object light scattering intensity and at least a time profile of object position to produce a set of extracted image feature data; identifying one or more patterns in the set of extracted image feature data to produce one or more sets of identified patterns; and differentiating at least one pathogenic microorganism indicative of a disease in a subject from other objects in the plurality of objects in the liquid sample based upon the one or more sets of identified patterns using a trained classifier.

BRIEF DESCRIPTION OF THE DRAWINGS

The accompanying drawings, which are incorporated in and constitute a part of this specification, illustrate certain embodiments, and together with the written description, serve to explain certain principles of the compositions, methods, and related aspects disclosed herein. The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

FIG. 5A Schematic illustration of the experimental setup for single E. coli imaging and temporal trajectory tracking. FIG. 5B E. coli rotation-induced scattering intensity fluctuation tracking compared to 1 µm beads. FIG. 5C Sub-pixel motion tracking of single E. coli compared to 1 µm beads. FIG. 5D Characterization of E. coli cell population from single cell phenotypic features including intensity fluctuation (Normalized Intensity Standard Deviation, NISD) (from panel B) and micro-motion (MSD, mean square displacement) (from panel C).

FIG. 6A Single cell motion and intensity mapping for E. coli and 1 µm polystyrene beads. FIG. 6B Comparison of the corresponding micro motion (top panel) and intensity fluctuation (lower panel) of single E. coli cell and 1 µm polystyrene bead. FIG. 6C Training results with machine learning classification (Support Vector Machine, SVM) based on mean squared displacement (MSD) of single cell motion and normalized intensity standard deviation (NISD) of single cell intensity. FIG. 6D Classification of a 4:1 mixed sample of E. coli: polystyrene beads with the trained SVM model.

FIG. 7A Single cell motion and intensity mapping for E. coli and S. saprophyticus. FIG. 7B Comparison of the corresponding micro motion (upper panel) and intensity fluctuation (lower panel) for single E. coli and S. saprophyticus cells. FIG. 7C Training results obtained from individual pure cultures of E. coli (n=267) and S. saprophyticus (n=211) with machine learning classification (Support Vector Machine, SVM) based on mean squared displacement (MSD) of single cell motion and normalized intensity standard deviation (NISD) of single cell intensity. FIG. 7D Testing results obtained from individual pure cultures of both E. coli cells (n=109) and S. saprophyticus cells (n=96) with the trained SVM model.

FIG. 8A Single cell motion and intensity mapping for cultured E. coli cells and urine particles. FIG. 8B Comparison of the corresponding micro motion (top panel) and intensity fluctuation (lower panel) of a single E. coli cell and a single urine particle. FIG. 8C The corresponding training results of E. coli (n=185) and urine particles (n=155) with machine learning classification (Support Vector Machine, SVM) based on mean squared displacement (MSD) of single cell motion and normalized intensity standard deviation (NISD) of single cell intensity. FIG. 8D The corresponding testing results of E. coli (n=80) and urine particles (n=66) with the trained SVM model.

FIG. 9A SVM classification result of one representative infection negative sample (Sample #11). FIG. 9B SVM classification result of one representative infection positive sample (Sample #12). FIG. 9C The ROC curve for threshold determination with the first 20 clinical samples. FIG. 9D Comparison of reference method (BD Phoenix) and phenotypic tracking for LVSi-RD of UTIs. $T_I$ indicates the determined infection threshold.

DEFINITIONS

Figure 1:
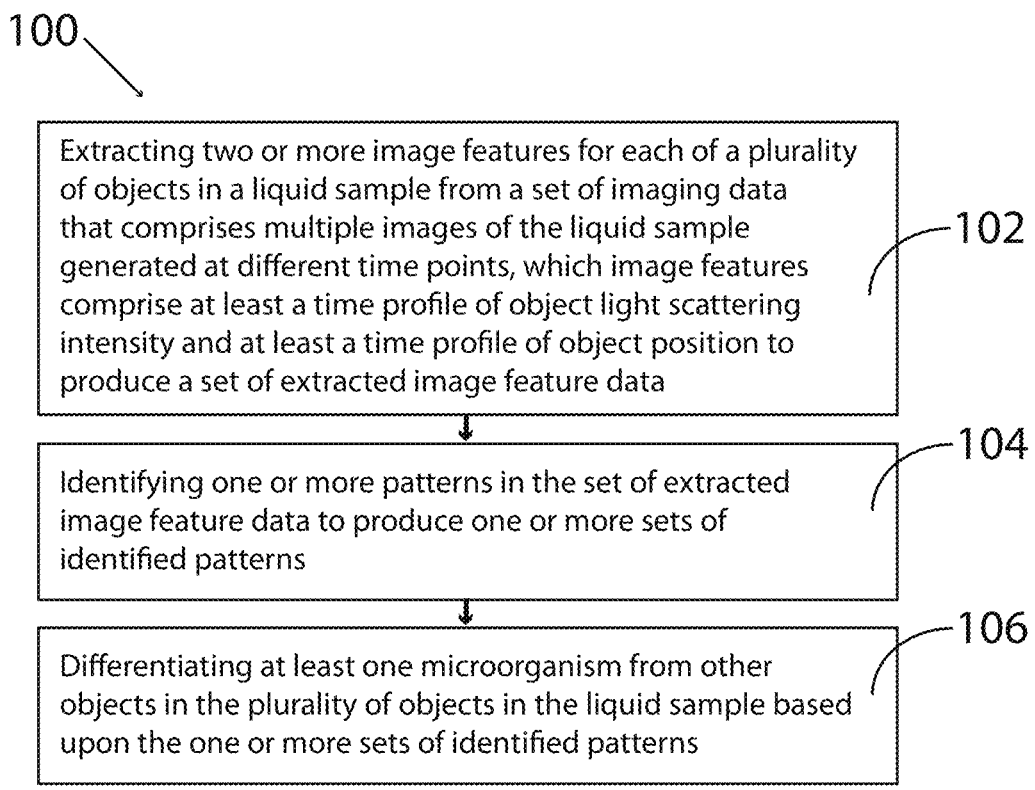
FIG. 1 is a flow chart that schematically shows exemplary method steps of detecting a target microorganism in a liquid sample according to some aspects disclosed herein.

In order for the present disclosure to be more readily understood, certain terms are first defined below. Additional definitions for the following terms and other terms may be set forth throughout the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

It is also to be understood that the terminology used herein is for the purpose of describing particular embodiments only and is not intended to be limiting. Further, unless defined otherwise, all technical and scientific terms used herein have the same meaning as commonly understood by one of ordinary skill in the art to which this disclosure pertains. In describing and claiming the methods, systems, and computer readable media, the following terminology, and grammatical variants thereof, will be used in accordance with the definitions set forth below.

About: As used herein, "about" or "approximately" or "substantially" as applied to one or more values or elements of interest, refers to a value or element that is similar to a stated reference value or element. In certain embodiments, the term "about" or "approximately" or "substantially" refers to a range of values or elements that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value or element unless otherwise stated or otherwise evident from the context (except where such number would exceed 100% of a possible value or element).

Administer: As used herein, "administer" or "administering" a therapeutic agent (e.g., an antibiotic) to a subject means to give, apply or bring the composition into contact with the subject. Administration can be accomplished by any of a number of routes, including, for example, topical, oral, subcutaneous, intramuscular, intraperitoneal, intravenous, intrathecal and intradermal.

Classifier: As used herein, "classifier" generally refers to algorithm computer code that receives, as input, test data and produces, as output, a classification of the input data as belonging to one or another class (e.g., pathogenic microorganism or non-pathogenic microorganism).

Machine Learning Algorithm: As used herein, "machine learning algorithm" generally refers to an algorithm, executed by computer, that automates analytical model building, e.g., for clustering, classification or pattern recognition. Machine learning algorithms may be supervised or unsupervised. Learning algorithms include, for example, artificial neural networks (e.g., back propagation networks), discriminant analyses (e.g., Bayesian classifier or Fisher's analysis), support vector machines, decision trees (e.g., recursive partitioning processes such as CART—classification and regression trees, or random forests), linear classifiers (e.g., multiple linear regression (MLR), partial least squares (PLS) regression, and principal components regression), hierarchical clustering, and cluster analysis. A dataset on which a machine learning algorithm learns can be referred to as "training data." A model produced using a machine learning algorithm is generally referred to herein as a "machine learning model."

Sample: As used herein, "sample" means any biological sample capable of being analyzed by the methods and/or systems disclosed herein. In certain aspects of the present disclosure, samples are bodily fluid samples, for example, whole blood or fractions thereof, lymphatic fluid, urine, and/or cerebrospinal fluid, among other bodily fluid types.

Subject: As used herein, "subject" refers to an animal, such as a mammalian species (e.g., human) or avian (e.g., bird) species. More specifically, a subject can be a vertebrate, e.g., a mammal such as a mouse, a primate, a simian or a human. Animals include farm animals (e.g., production cattle, dairy cattle, poultry, horses, pigs, and the like), sport animals, and companion animals (e.g., pets or support animals). A subject can be a healthy individual, an individual that has or is suspected of having a disease or a predisposition to the disease, or an individual that is in need of therapy or suspected of needing therapy. The terms "individual" or "patient" are intended to be interchangeable with "subject."

DETAILED DESCRIPTION

Bacterial infections are a rising threat to public health as bacteria are both evolving and acquiring resistance to multiple, commonly used antibiotics. As the main approach for bacterial infection diagnostics, many healthcare facilities rely on isolation and culturing techniques, a slow process that forces treatments to be empirical, aggravating the antimicrobial resistance problem. Accordingly, in some aspects of the present disclosure, a point-of-care compatible method for rapid bacterial or other microbial infection detection in about 10 minutes is presented. Some of these embodiments use a large volume solution scattering imaging (LVSi) system with low magnifications (1-2×) to visualize bacteria in clinical samples, thus eliminating the need for culture-based isolation and enrichment.

To illustrate, FIG. 1 is a flow chart that schematically shows exemplary method steps of detecting a target microorganism in a liquid sample. As shown, the method 100 includes extracting two or more image features for each of a plurality of objects in the liquid sample from a set of imaging data that comprises multiple images of the liquid sample generated at different time points (e.g., a time-lapsed video). The image features comprise at least a time profile of object light scattering intensity and at least a time profile of object position to produce a set of extracted image feature data (Step 102). Method 100 also includes identifying one or more patterns in the set of extracted image feature data to produce one or more sets of identified patterns (Step 104). In addition, method 100 also includes differentiating at least one microorganism from other objects in the plurality of objects in the liquid sample based upon the one or more sets of identified patterns (Step 106).

Figure 2:
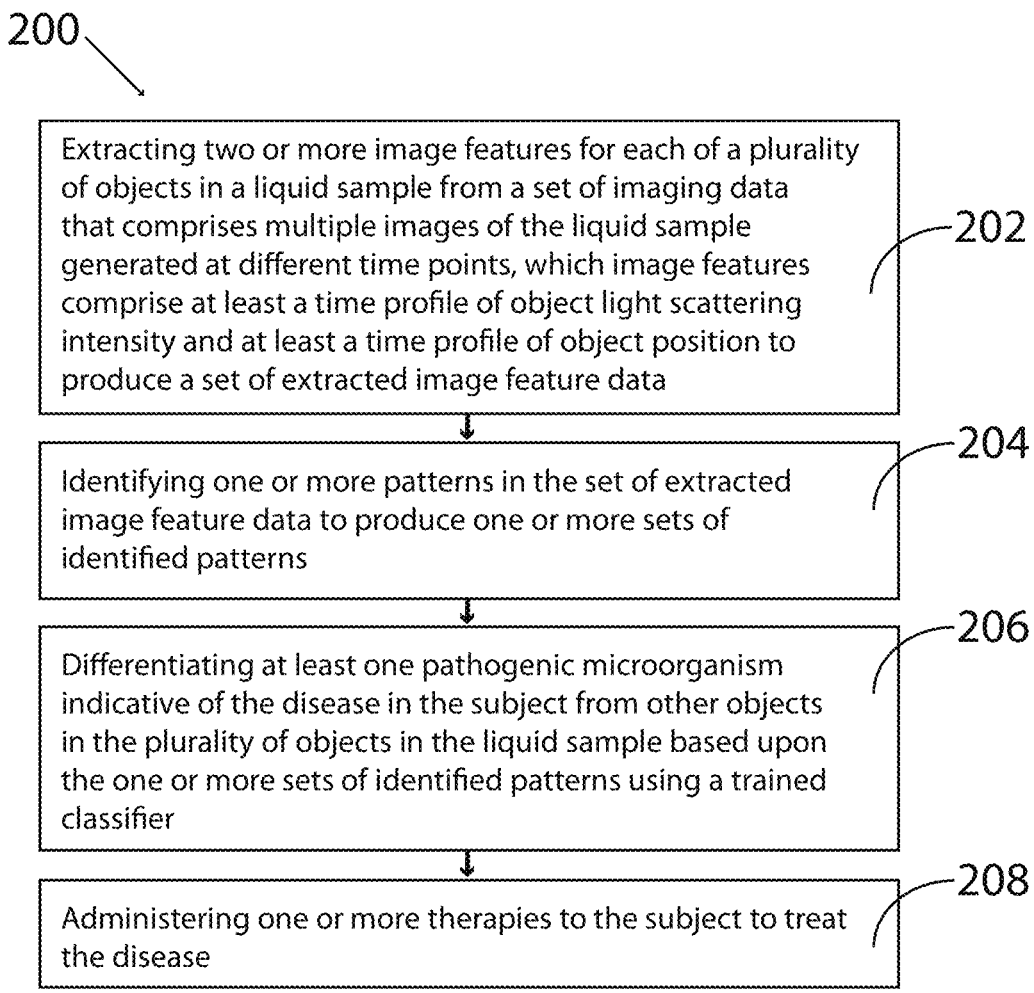
FIG. 2 is a flow chart that schematically shows exemplary method steps of treating an infectious disease in a subject according to some aspects disclosed herein.

To further illustrate, FIG. 2 is a flow chart that schematically shows exemplary method steps of treating an infectious disease in a subject. As shown, method 200 includes extracting two or more image features for each of a plurality of objects in a liquid sample from a set of imaging data that comprises multiple images of the liquid sample generated at different time points, which image features comprise at least a time profile of object light scattering intensity and at least a time profile of object position to produce a set of extracted image feature data (Step 202). Method 200 also includes identifying one or more patterns in the set of extracted image feature data to produce one or more sets of identified patterns (Step 204) and differentiating at least one pathogenic microorganism indicative of the disease in the subject from other objects in the plurality of objects in the liquid sample based upon the one or more sets of identified patterns using a trained classifier (Step 206). Method 200 also includes administering one or more therapies to the subject to treat the disease (Step 208).

Figure 3:
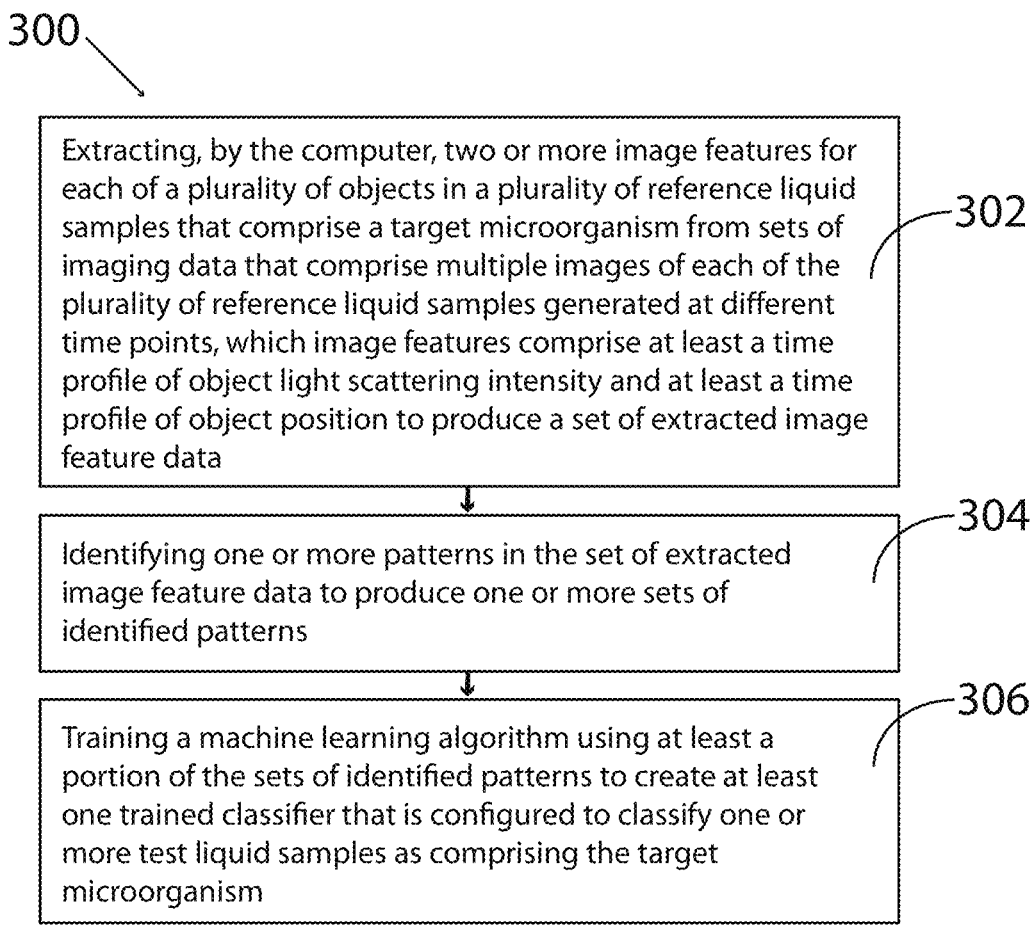
FIG. 3 is a flow chart that schematically shows exemplary method steps of generating a trained classifier according to some aspects disclosed herein.

As an additional illustration, FIG. 3 is a flow chart that schematically shows exemplary method steps of generating a trained classifier. As shown, method 300 includes extracting two or more image features for each of a plurality of objects in a plurality of reference liquid samples from sets of imaging data that comprise multiple images of each of the plurality of reference liquid samples generated at different time points, which image features comprise at least a time profile of object light scattering intensity and at least a time profile of object position to produce a set of extracted image feature data (Step 302). Method 300 also includes identifying one or more patterns in the set of extracted image feature data to produce one or more sets of identified patterns (Step 304). In addition, method 300 also includes training a machine learning algorithm using at least a portion of the sets of identified patterns to create at least one trained classifier that is configured to classify one or more test liquid samples as comprising a target microorganism (Step 306).

Figure 5A:
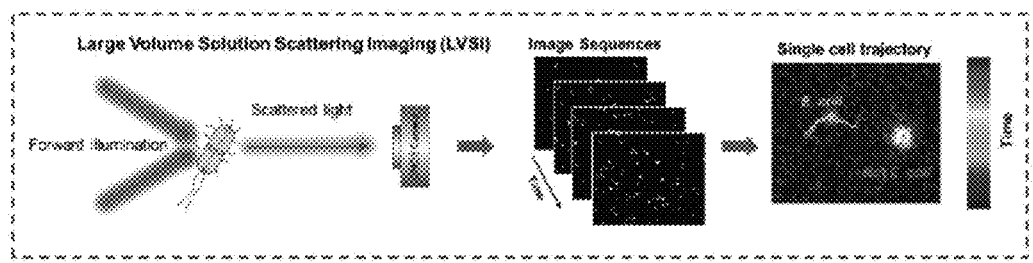
FIGS. 5A-5D show the principle of single cell phenotypic feature tracking for rapid E. coli detection and differentiation from 1 µm polystyrene beads according to some aspects disclosed herein.

Typically, particle information extracted from video of their forward light scattering, the x-y locations and intensity as a function of time, are correlated with three key intrinsic particle phenotypic features—size, shape, and motility—and thus can be used to differentiate, for example, bacteria from abiotic particles. To extract the phenotypic features of individual particles, an automated image processing algorithm is implemented in some embodiments. First, common background noise and image drift are corrected with temporal local minimal subtraction, which improves the image contrast. Second, a Laplace of Gaussian (LOG) filter is used to detect individual cells and particles (bright spots in the image). Third, directional linking of spots in adjacent frames is performed using the Kalman filter to obtain single cell tracking trajectories (FIG. 5A). Finally, the image features, including time profiles of particle scattering intensity and position, are extracted from each trajectory for detailed particle characterization.

Figure 5B:
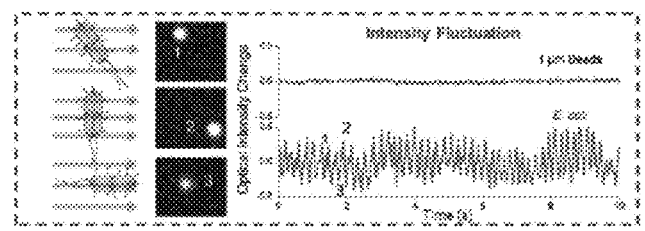

The scattering intensity provides particle size information as it is proportional to the scattering cross sections of the particle. The intensity fluctuation patterns also depend on particle shape and orientation for non-sphere particles, such as rod-shaped bacterial cells. One example is *E. coli*, which scatters maximum light when the illumination is perpendicular to the long axis of the cell, and scatters minimal light when illumination is in parallel with the long axis of the cell (FIG. 5B). The intensity fluctuates with the rotation of the bacterial cells in a solution, which can be used for cell size and shape characterization. To compare the intensity results of different particles, scattering intensity values ($I_t$) are normalized to the mean intensity ($\mu$) and the detection accuracy of the normalized intensity is ~0.002. To quantify the scattering intensity fluctuation of single particles, the normalized intensity standard deviation (NISD) is calculated by:

$$\langle\langle\sigma_N\rangle\rangle \equiv \langle\frac{\sigma}{\mu}\rangle = \langle\frac{std(I_t)}{ave(I_t)}\rangle \qquad [1]$$

where $I_t$ is the scattering intensity profile over time t, $\mu$ is the mean intensity, and $\sigma$ is the intensity standard deviation.

Figure 5D:
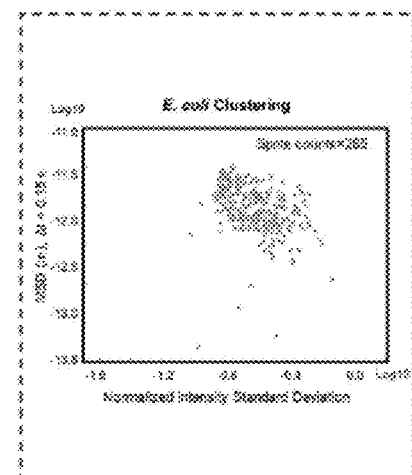
Figure 5C:
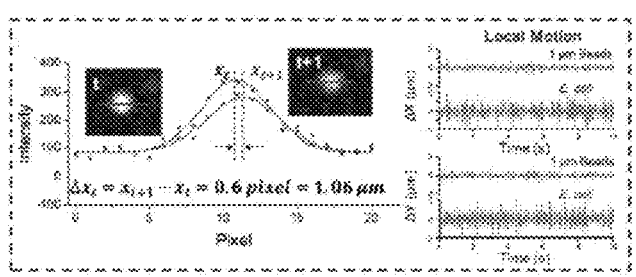

Particles in a solution move due to Brownian motion and thermal drift. For live bacterial cells, the movement also includes intrinsic metabolic motion, as with motile bacterial species. By carefully tracking the movement of single particles, the intrinsic Brownian motion and metabolic motion can be extracted for both size and cell motility characterization. In the LVSi system used in some embodiments, the thermal flux induced drift dominates a particle's overall motion in a 30 second duration video. To remove the low frequency drift effects and extract the micro motion of particles, local movement in the minimal time period is typically used. In some embodiments, images are recorded at 65 frames per second (fps), so the minimum time for local movement tracking is ~15 ms, the time interval between two adjunct frames, during which the swimming or tumbling displacement of *E. coli* is estimated to be 0.5 µm. In some embodiments, the sub-pixel displacement of single cells is measured with a 2-D Laplace of Gaussian (LOG) fitting, from which the center position is derived at each time point ($x_t$, $y_t$), and the local movement is defined as the center position's displacement between two adjacent frames ($\Delta x_t = x_{t+1} - x_t$, $\Delta y_t = y_{t+1} - y_t$, FIG. 5C). With a tracking accuracy of ~40 nm for local displacement, the local micro motion of single particles is tracked over time, from which the random Brownian motion can be easily distinguished from the physiological, directional swimming or tumbling motion of bacterial cells. To quantify the micro motion, the mean square displacement (MSD), $\langle[\Delta x(t)^2]\rangle$, for a given duration, lag t, is calculated from the trajectory of each particle, which can be fit to extract physical information, such as the diffusion coefficient (D) of each particle for size estimation. According to the Einstein's equation:

$$\langle[\Delta x(t)2^2]\rangle \equiv \langle(x(t)-x(0))^2\rangle = 2Dt \qquad [2]$$

$$D = \frac{T}{6\pi\eta r} \qquad [3]$$

where t is time, T is Temperature, $\eta$ is viscosity of the fluid, and r is radius of the particle. Thus, the MSD is inversely proportional to the particle size at a given condition. With both the NISD and MSD obtained, the particle population in the 30 second solution scattering video was clustered for particle classification. FIG. 5D shows one representative classification of *E. coli* cells.

Figure 4:
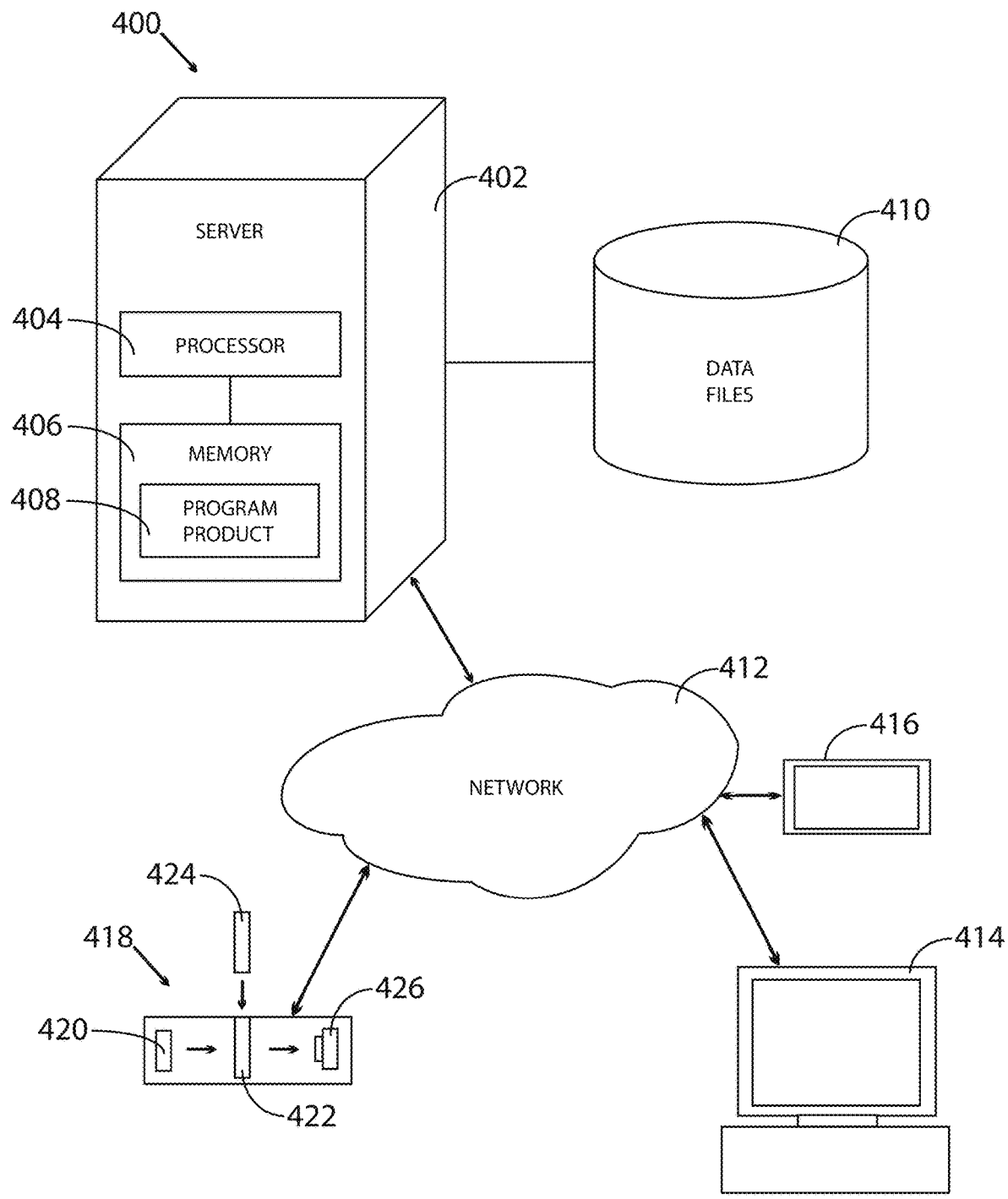
FIG. 4 is a schematic diagram of an exemplary system suitable for use with certain aspects disclosed herein.

The present disclosure also provides various systems and computer program products or machine-readable media. In some aspects, for example, the methods described herein are optionally performed or facilitated at least in part using systems, distributed computing hardware and applications (e.g., cloud computing services), electronic communication networks, communication interfaces, computer program products, machine readable media, electronic storage media, software (e.g., machine-executable code or logic instructions) and/or the like. To illustrate, FIG. 4 provides a schematic diagram of an exemplary system suitable for use with implementing at least aspects of the methods disclosed in this application. As shown, system 400 includes at least one controller or computer, e.g., server 402 (e.g., a search engine server), which includes processor 404 and memory, storage device, or memory component 406, and one or more other communication devices 414, 416, (e.g., client-side computer terminals, telephones, tablets, laptops, other mobile devices, etc. (e.g., for receiving test subject data sets or results, etc.) in communication with the remote server 402, through electronic communication network 412, such as the Internet or other internetwork. Communication devices 414, 416 typically include an electronic display (e.g., an internet enabled computer or the like) in communication with, e.g., server 402 computer over network 412 in which the electronic display comprises a user interface (e.g., a graphical user interface (GUI), a web-based user interface, and/or the like) for displaying results upon implementing the methods described herein. In certain aspects, communication networks also encompass the physical transfer of data from one location to another, for example, using a hard drive, thumb drive, or other data storage mechanism. System 400 also includes program product 408 (e.g., for detecting a target microorganism as described herein) stored on a computer or machine readable medium, such as, for example, one or more of various types of memory, such as memory 406 of server 402, that is readable by the server 402, to facilitate, for example, a guided search application or other executable by one or more other communication devices, such as 414 (schematically shown as a desktop or personal computer). In some aspects, system 400 optionally also includes at least one database server, such as, for example, server 410 associated with an online website having data stored thereon (e.g., entries corresponding to temporal and spatial data, etc.) searchable either directly or through search engine server 402. System 400 optionally also includes one or more other servers positioned remotely from server 402, each of which are optionally associated with one or more database servers 410 located remotely or located local to each of the other servers. The other servers can beneficially provide service to geographically remote users and enhance geographically distributed operations.

As understood by those of ordinary skill in the art, memory 406 of the server 402 optionally includes volatile and/or nonvolatile memory including, for example, RAM, ROM, and magnetic or optical disks, among others. It is also understood by those of ordinary skill in the art that although illustrated as a single server, the illustrated configuration of server 402 is given only by way of example and that other types of servers or computers configured according to various other methodologies or architectures can also be used. Server 402 shown schematically in FIG. 4, represents a server or server cluster or server farm and is not limited to any individual physical server. The server site may be deployed as a server farm or server cluster managed by a server hosting provider. The number of servers and their architecture and configuration may be increased based on usage, demand and capacity requirements for the system 400. As also understood by those of ordinary skill in the art, other user communication devices 414, 416 in these aspects, for example, can be a laptop, desktop, tablet, personal digital assistant (PDA), cell phone, server, or other types of computers. As known and understood by those of ordinary skill in the art, network 412 can include an internet, intranet, a telecommunication network, an extranet, or world wide web of a plurality of computers/servers in communication with one or more other computers through a communication network, and/or portions of a local or other area network.

As further understood by those of ordinary skill in the art, exemplary program product or machine readable medium 408 is optionally in the form of microcode, programs, cloud computing format, routines, and/or symbolic languages that provide one or more sets of ordered operations that control the functioning of the hardware and direct its operation. Program product 408, according to an exemplary aspect, also need not reside in its entirety in volatile memory, but can be selectively loaded, as necessary, according to various methodologies as known and understood by those of ordinary skill in the art.

As further understood by those of ordinary skill in the art, the term "computer-readable medium" or "machine-readable medium" refers to any medium that participates in providing instructions to a processor for execution. To illustrate, the term "computer-readable medium" or "machine-readable medium" encompasses distribution media, cloud computing formats, intermediate storage media, execution memory of a computer, and any other medium or device capable of storing program product 208 implementing the functionality or processes of various aspects of the present disclosure, for example, for reading by a computer. A "computer-readable medium" or "machine-readable medium" may take many forms, including but not limited to, non-volatile media, volatile media, and transmission media. Non-volatile media includes, for example, optical or magnetic disks. Volatile media includes dynamic memory, such as the main memory of a given system. Transmission media includes coaxial cables, copper wire and fiber optics, including the wires that comprise a bus. Transmission media can also take the form of acoustic or light waves, such as those generated during radio wave and infrared data communications, among others. Exemplary forms of computer-readable media include a floppy disk, a flexible disk, hard disk, magnetic tape, a flash drive, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Program product 408 is optionally copied from the computer-readable medium to a hard disk or a similar intermediate storage medium. When program product 408, or portions thereof, are to be run, it is optionally loaded from their distribution medium, their intermediate storage medium, or the like into the execution memory of one or more computers, configuring the computer(s) to act in accordance with the functionality or method of various aspects disclosed herein. All such operations are well known to those of ordinary skill in the art of, for example, computer systems.

In some aspects, program product 408 includes non-transitory computer-executable instructions which, when executed by electronic processor 404, perform at least: extracting two or more image features for each of a plurality of objects in a liquid sample obtained from the subject from a set of imaging data that comprises multiple images of the liquid sample generated at different time points, which image features comprise at least a time profile of object light scattering intensity and at least a time profile of object position to produce a set of extracted image feature data; identifying one or more patterns in the set of extracted image feature data to produce one or more sets of identified patterns; and differentiating at least one pathogenic microorganism indicative of the disease in the subject from other objects in the plurality of objects in the liquid sample based upon the one or more sets of identified patterns using a trained classifier.

Typically, imaging data is obtained from samples using imaging device 418. As shown, imaging device 418 includes light source 420 and liquid sample analysis area 422 in communication with light source 420 (i.e., liquid sample analysis area 422 receives light transmitted from light source 420). Liquid sample analysis area 422 is configured to receive sample container 424 (e.g., a cuvette or the like). Imaging device 418 also includes camera 426 in communication with liquid sample analysis area 422. Camera 426 receives scattered light from samples disposed in liquid sample analysis area 422. In some embodiments, imaging device 418 is configured to wirelessly communicate with server 402 and/or other user communication devices 414, 416. In some embodiments, imaging device 418 is configured as a point-of-care device. In some embodiments, imaging device 418 is configured as a stand-alone device with an integrated processor, memory, and logic instructions, and is not part of system 400.

Example: Rapid Detection of Urinary Tract Infection in 10 Minutes by Tracking Multiple Phenotypic Features in a 30-Second Large Volume Scattering Video of Urine Microscopy In the present example, we present a UTI screening approach performed directly on a urine sample in less than 10 minutes that is based on LVSi tracking of multiple intrinsic bacterial phenotypic features for rapid detection (RD). LVSi-RD is compatible with POC settings since it allows direct analysis of clinical samples without bacterial enrichment and isolation. Sufficient volume of the specimen can be observed in a single field of view with LVSi for direct detection of clinically relevant concentrations of bacteria. Intrinsic phenotypic features of single particles, including particle size, shape, and motion, can be tracked with scattering light intensities and position profiles. By tracking these intrinsic phenotypic features of single cells in a short video and clustering with a machine learning algorithm, we can differentiate E. coli from similarly-sized polystyrene beads, discriminate between common bacterial morphologies, accurately determine the presence of E. coli and/or similarly-shaped bacteria in urine, and differentiate bacteria from other particles commonly found in urine. We demonstrated diagnosis of clinical UTIs in patient urine samples with our method and validated the results using traditional culture-based methods and clinical lab testing. Additional details related to the present example are also discussed in Zhang et al., "Rapid Detection of Urinary Tract Infection in 10 min by Tracking Multiple Phenotypic Features in a 30 s Large-Volume Scattering Video of Urine Microscopy," ACS Sensors, 7(8):2262-2272 (2022) and its supporting information, which are each incorporated by reference in their entirety.

Results and Discussion

Principle

Light scattering is a label-free and non-invasive analytical method for real-time detection and classification of small particle analytes, such as bacteria and cells. Flow cytometry systems, such as the FDA-approved UF-1000i (Sysmex), use a combination of light scattering and fluorescence to rapidly screen for the presence of bacteria in urine. However, flow cytometry requires expensive and complex instrumentation and needs regular calibration, maintenance, and personnel training. Here, we present a cuvette-based LVSi system with forward scattering detection and associated multi-phenotypic feature tracking algorithms for rapid detection and characterization of bacterial cells (FIG. 5A). Unlike the flow cytometry system that collects snapshots of information from single particles, LVSi records time-lapsed video of multiple particles and measures the temporal light scattering profile with single cell resolution. As shown in FIG. 5A, LVSi images particles (bacterial cells and impurity particles) in the sample solution as individual bright spots moving over time due to physiological movement, Brownian motion, and thermal reflux. To extract the phenotypic features of individual particles, an automated image processing algorithm is implemented. First, common background noise and image drift are corrected with temporal local minimal subtraction, which improves the image contrast. Second, a Laplace of Gaussian (LOG) filter is used to detect individual cells and particles (bright spots in the image). Third, directional linking of spots in adjacent frames is performed using the Kalman filter to obtain single cell tracking trajectories (FIG. 5A). Finally, the image features, including time profiles of particle scattering intensity and position, are extracted from each trajectory for detailed particle characterization.

The scattering intensity provides particle size information as it is proportional to the scattering cross sections of the particle. The intensity fluctuation patterns also depend on particle shape and orientation for non-sphere particles, such as rod-shaped bacterial cells. One example is E. coli, which scatters maximum light when the illumination is perpendicular to the long axis of the cell, and scatters minimal light when illumination is in parallel with the long axis of the cell (FIG. 5B). The intensity fluctuates with the rotation of the bacterial cells in a solution, which can be used for cell size and shape characterization. To compare the intensity results of different particles, scattering intensity values ($I_t$) are normalized to the mean intensity (p) and the detection accuracy of the normalized intensity is ~0.002. To quantify the scattering intensity fluctuation of single particles, the normalized intensity standard deviation (NISD) is calculated by:

$$\langle\langle \sigma_N \rangle\rangle \equiv \langle \frac{\sigma}{\mu} \rangle = \langle \frac{std(I_t)}{ave(I_t)} \rangle \qquad [1]$$

where $I_t$ is the scattering intensity profile over time t, $\mu$ is the mean intensity, and $\sigma$ is the intensity standard deviation.

Particles in a solution move due to Brownian motion and thermal drift. For live bacterial cells, the movement also includes intrinsic metabolic motion, as with motile bacterial species. By carefully tracking the movement of single particles, the intrinsic Brownian motion and metabolic motion can be extracted for both size and cell motility characterization. In the present LVSi system, the thermal flux induced drift dominates a particle's overall motion in the 30 seconds duration video. To remove the low frequency drift effects and extract the micro motion of particles, local movement in the minimal time period was used. Images were recorded at 65 frames per second (fps), so the minimum time for local movement tracking is ~15 ms, the time interval between two adjunct frames, during which the swimming or tumbling displacement of E. coli is estimated to be 0.5 μm. The sub-pixel displacement of single cells is measured with a 2-D Laplace of Gaussian (LOG) fitting, from which the center position is derived at each time point ($x_t$, $y_t$), and the local movement is defined as the center position's displacement between two adjacent frames ($\Delta x_t = x_{t+1} - x_t$, $\Delta y_t = y_{t+1} - y_t$, FIG. 5C). With a tracking accuracy of ~40 nm for local displacement, the local micro motion of single particles is tracked over time, from which the random Brownian motion can be easily distinguished from the physiological, directional swimming or tumbling motion of bacterial cells. To quantify the micro motion, the mean square displacement (MSD), $\langle[\Delta x(t)^2]\rangle$, for a given duration, lag t, is calculated from the trajectory of each particle, which can be fit to extract physical information, such as the diffusion coefficient (D) of each particle for size estimation. According to the Einstein's equation:

$$\langle[\Delta x(t)2^2]\rangle \equiv \langle(x(t)-x(0))^2\rangle = 2Dt \qquad [2]$$

$$D = \frac{T}{6\pi\eta r} \qquad [3]$$

where t is time, T is Temperature, $\eta$ is viscosity of the fluid, and r is radius of the particle. Thus, the MSD is inversely proportional to the particle size at a given condition. With both the NISD and MSD obtained, the particle population in the 30 second solution scattering video was clustered for particle classification. FIG. 5D shows one representative classification of *E. coli* cells.

Differentiate *E. coli* Cells from Spherical Polystyrene Beads

Figure 6A:
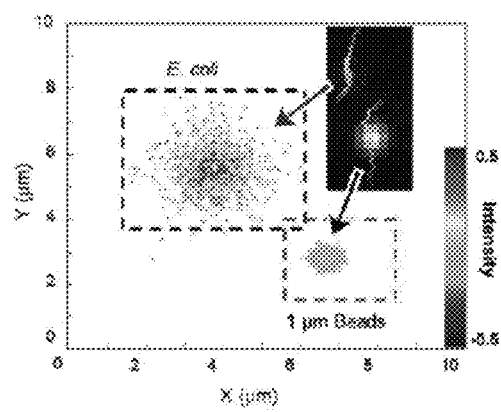
FIGS. 6A-6D show differentiation of E. coli from polystyrene beads by phenotypic features tracking.
Figure 6B:
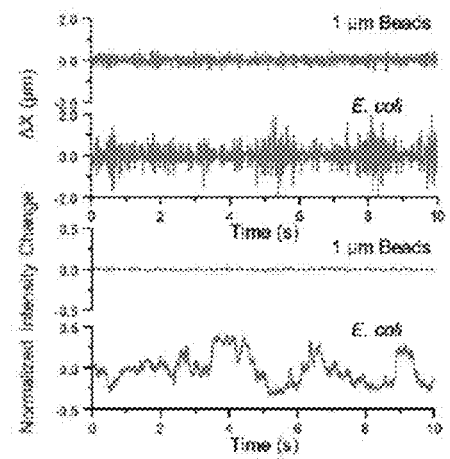
Figure 6C:
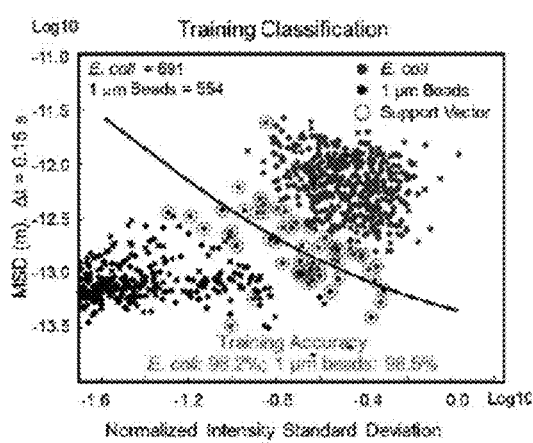
Figure 6D:
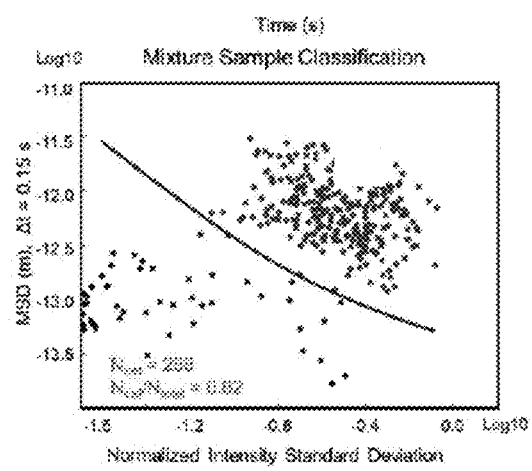

To establish the method, *E. coli* cultures (see Materials and Methods) and 1 μm polystyrene beads were tested for rapid differentiation and classification. First, pure *E. coli* cells and 1 μm polystyrene beads in solution were imaged separately with LSVi at 65 fps for 30 seconds. For each particle in the video, single-cell trajectory was tracked and both the intensity fluctuation and the x-y local movement profile were mapped. One representative result is shown in FIG. 6A, in which the *E. coli* cell shows higher intensity fluctuation and larger micro motion than the abiotic bead. For more accurate comparisons, the local movement along x axis (Δx, similar for y direction movement) and intensity profile (normalized to the average intensity value) were plotted in FIG. 6B. *E. coli* shows continuous motion with ~1 μm oscillation amplitude, while ~0.2 μm micro motion is observed from the spherical beads. Also, *E. coli* shows greater intensity variation compared to 1 μm polystyrene beads. To classify the *E. coli* cells and beads, a traditional machine learning method, support vector machine (SVM), was employed for efficient unsupervised clustering. FIG. 6C shows the training result with an accuracy of 98.2% for *E. coli* and 98.5% for bead classification. To test the trained model, a sample with both *E. coli* cells and 1 μm polystyrene beads at approximately 4:1 ratio was measured (FIG. 6D). The classification of particles in the sample using extracted intensity fluctuation (NISD) and local movement (MSD) information confirmed ~80% of the mixed sample as bacterial cells (FIG. 6D).

The particle information extracted from video of their forward light scattering, the x-y locations and intensity as a function of time, are correlated with three key intrinsic particle phenotypic features—size, shape, and motility—and thus can be used to differentiate bacteria from abiotic particles. For spherical abiotic beads, the intensity fluctuations and the local movements were small, due to the homogeneous shape and pure Brownian motion. In contrast, for *E. coli* cells, the scattering intensity variation over time provides information about the size, rod shape of the cell, and motility. The peak intensity correlates with the length of the cell, the valley intensity reflects its width, and the intensity fluctuation pattern indicates the bacterial metabolic activities (e.g., swimming, tumbling, and rotation). The tracked micro motion of each bacterial cell also reflected the motility (e.g., swimming, running, tumbling) status of the cell, especially for the running cells, which showed periodic intensity fluctuation with certain frequency and regular movement patterns. Thus, multiple phenotypic features allow for the rapid differentiation of *E. coli* cells from the homogeneous spherical beads with the LVSi-RD system.

Differentiate Rod-Shaped Bacteria (e.g., *E. coli*) from Spherical-Shaped Bacteria (e.g., *Staphylococcus saprophyticus*)

Figure 7A:
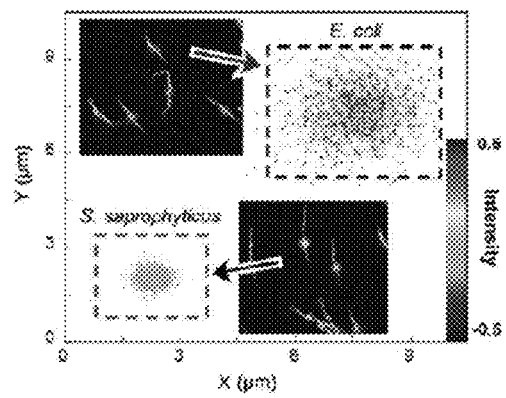
FIGS. 7A-7D show differentiation of rod-shaped bacteria (E. coli) and spherically-shaped bacteria (S. saprophyticus) by single-cell phenotypic features tracking.
Figure 7B:
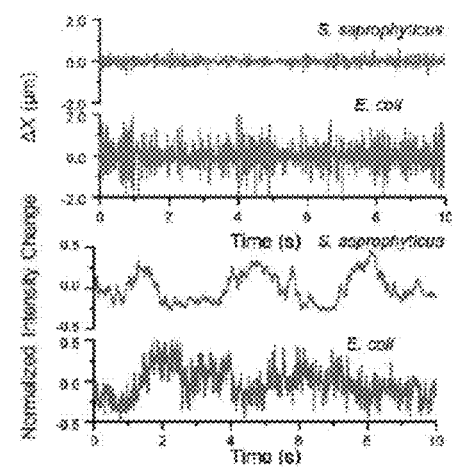
Figure 7C:
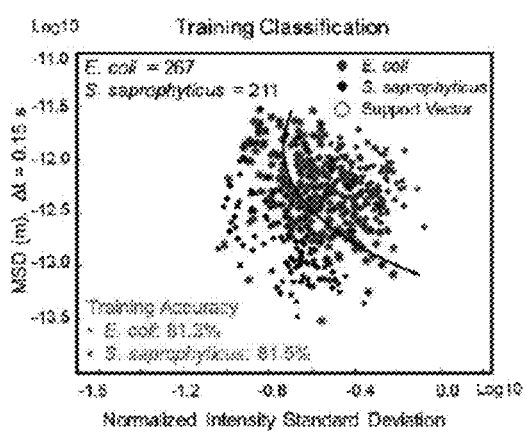
Figure 7D:
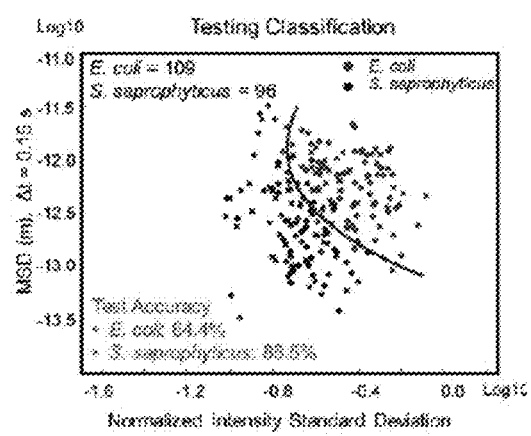

Bacteria are classified, in part, according to their cell shape, such as bacilli (rods), cocci (spheres), and others (spiral, curved). As this information can be useful in determining empirical treatment, we evaluated the capability of LVSi-RD to differentiate bacilli and cocci bacteria. *E. coli* and *S. saprophyticus* are used as models for rod- and sphere-shaped cells, respectively, as they are microorganisms frequently associated with UTIs. Both bacterial cultures were prepared according to the Materials and Methods and subject to LVSi-RD with the protocol described above. The intensity-motion mapping obtained from representative cell trajectories for each organism is shown in FIG. 7A. *E. coli* exhibited approximately double the motion in both x and y direction, and broader intensity range compared to *S. saprophyticus*. FIG. 7B plots the time profile of x direction motion and normalized intensity. The intensity profile of *E. coli* shows more frequent intensity fluctuations (FIG. 7B, upper panel), indicating the rotational motion of the rod-shaped cell. However, the NISD for *E. coli* and *S. saprophyticus* cells is similar (FIG. 7B, lower panel), perhaps due to movement of *S. saprophyticus* cell clusters. The NISD and MSD of the local movement of the bacterial cell are calculated and trained with the SVM algorithm. The training accuracies were ~81.3% and 81.5% for *E. coli* and *S. saprophyticus*, respectively (FIG. 7C). To test the trained model, we obtained another set of data from individual pure cultures of both *E. coli* cells (n=109) and *S. saprophyticus* cells (n=96) and classified them with the trained model (FIG. 7D). The pure culture testing accuracies were 84.4% and 88.5% for *E. coli* and *S. saprophyticus*, respectively (FIG. 7D). These results show that with LVSi and machine learning classification, we can distinguish bacilli from cocci bacteria, providing valuable information for initial bacterial differentiation and empirical antibiotic treatment. Our method mainly relies on the size and shape differences, with the potential to differentiate bacterial cells with similar shape, such as *E. coli* and *Klebsiella pneumoniae*. With optimization of the imaging system and additional data for training and calibration of a deep learning algorithm, we anticipate LVSi-RD can include additional phenotypic features (such as active movement and aspect ratio) to aid comprehensive interpretation of the urine sample.

Differentiate *E. coli* from Urine Particles

Figure 8A:
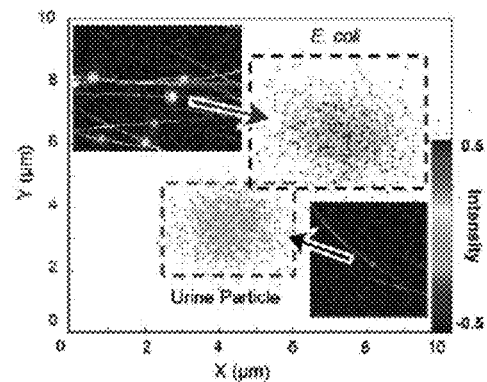
FIGS. 8A-8D show differentiation of bacterial cells from urine particles by phenotypic features tracking.
Figure 8B:
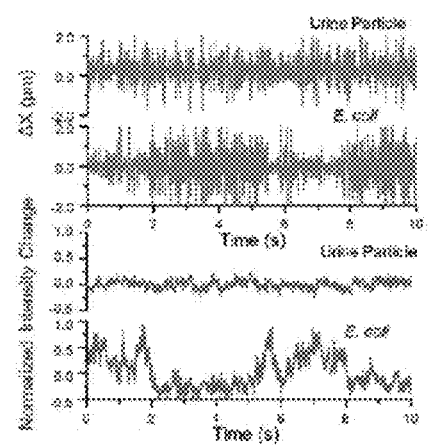
Figure 8C:
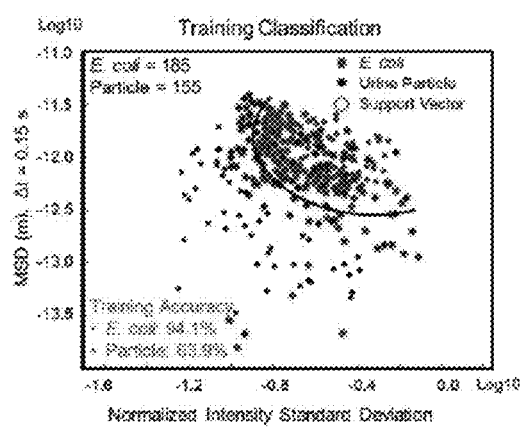
Figure 8D:
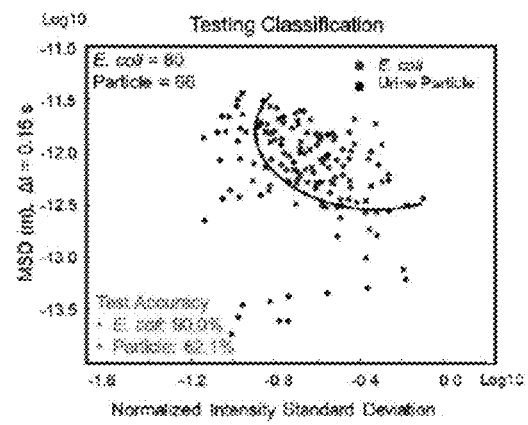
Figure 9A:
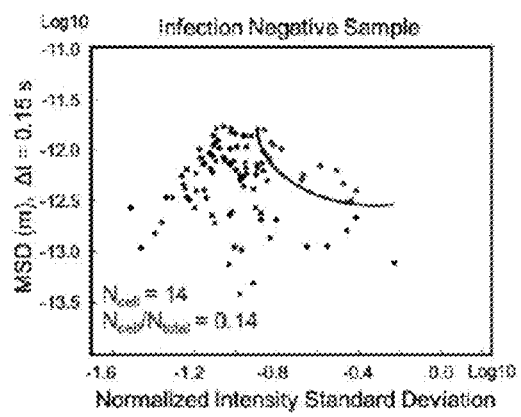
FIGS. 9A-9D show rapid infection detection with the trained SVM model.
Figure 9B:
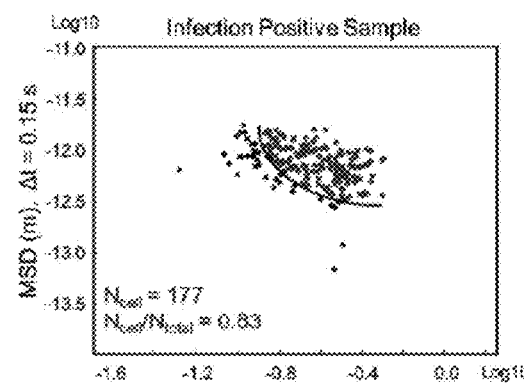
Figure 9C:
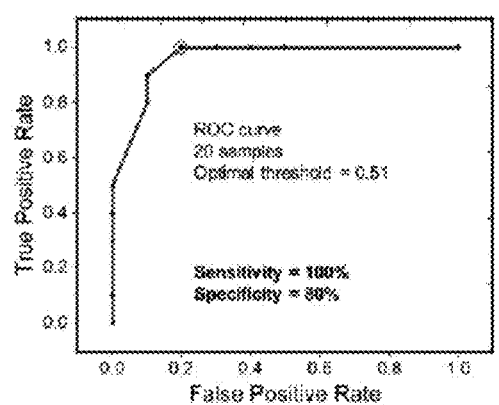
Figure 9D:
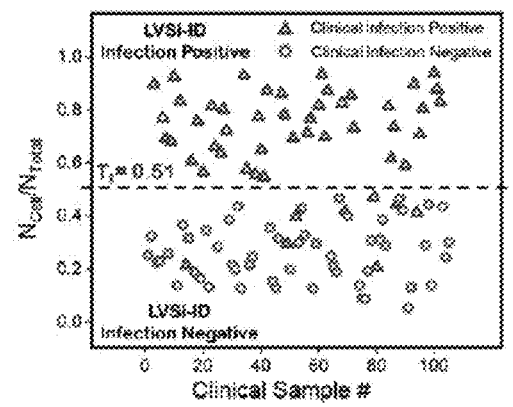

We have demonstrated that our LVSi and machine learning classification can be used to differentiate *E. coli* from polystyrene beads and distinguish between rod-shaped and spherically-shaped bacteria. However, to diagnose UTIs, the method should differentiate bacterial cells and non-bacterial particles in urine samples. Nonbacterial particles in urine originate from various sources and are heterogeneous in size, shape, and concentration. This dramatic heterogeneity makes them inherently difficult to classify as some particles may display structural features that are similar to bacterial cells. To test LSVi-RD for urine samples, we obtained LVSi video of pure *E. coli* cultures and pooled, healthy urine samples with particles (no bacteria present) for NISD and MSD tracking and SVM model training. FIG. 8A shows the trajectory and intensity-motion mapping of both *E. coli* and urine particles with very small differences observed directly. By further plotting the x direction motion and intensity fluctuation profile, we observe some minimal intensity amplitude differences, while the x direction motion patterns are indistinguishable (FIG. 8B). We proceeded to train the SVM algorithm with the NISD and MSD data and found the accuracy for *E. coli* classification remains high (94.1%), while the accuracy for urine particles was 63.9% (FIG. 8C). These results imply that *E. coli* cells showed consistent features while urine particle characteristics varied considerably. With the trained model, we tested another set of data with 80 *E. coli* cells and 66 urine particles and obtained testing accuracies of 90% for *E. coli* detection and 62.1% for urine particles classification (FIG. 8D). Thus, LVSi-RD can detect the presence of *E. coli* cells in a urine sample with high sensitivity. Although urine particles may contribute to some false positive bacterial counts, it may not affect the accuracy for signifying a bacterial-positive sample with a reasonable infection threshold, as described in the next section.

UTI Detection with Clinical Samples

To clinically assess LSVi-RD, we first determined an infection threshold and then used it to test 104 clinical urine samples to screen samples for UTI detection (FIG. 9). Since E. coli is the most predominant pathogen causing 80-90% of the community-acquired UTIs, the trained model of distinguishing E. coli from urine particles was used for clinical UTI screening. To determine an infection threshold, the receiver operating characteristic (ROC) curve was constructed using the relative amounts of cells/all particles ($N_{Cell}/N_{Total}$) as a predictor, and results were evaluated to determine the infection threshold for UTIs. From the ROC curve for the first 20 samples, of which 10 were positive and 10 were negative via clinical testing, we determined the infection threshold of 0.51 with a sensitivity of 100% and a specificity of 80% (FIG. 9C). The determined threshold was above the false positive rate (<0.4) caused by the urine particles in the trained model (FIG. 8D). Note, with the determined infection threshold ($T_I$) of 0.51, the trained model for E. coli differentiation from urine particles could also apply to the similarly sized and shaped bacteria of the Enterobacteriaceae family, such as K. pneumoniae. A representative negative sample (Sample #11), shown in FIG. 9A, exhibits the SMV model particle characterization in which a small relative proportion of particles were determined to be bacterial cells, while more than 80% of the particles were classified as bacterial cells in a positive sample (Sample #12), shown in FIG. 9B. Using a threshold of 0.51, 61 of the 104 clinical samples exhibited low ratio of bacterial cells to total particles ($N_{Cell}/N_{Total}$) and were categorized as LVSi-RD detection negative, while the remaining 43 samples revealed E. coli or other similar-sized, rod-shaped bacterial cells (e.g., K. pneumoniae and other Gram-negative bacilli) and were categorized as infection LVSi-RD detection positive. For cross validation, these results were compared with the BD Phoenix gold standard method results obtained in the Microbiology Lab at Mayo Clinic, where the samples were collected (FIG. 8D). Eight false negative samples were determined from the 104 samples tested, demonstrating an accuracy of 92.3% for rapid UTI detection. The parallel microbiological agar plating results showed that most of these false negative samples had bacterial concentrations below 1,000 CFU/mL after sample preparation, which is below the commonly used UTI clinical thresholds of 10,000 to 100,000 CFU/mL as a concerning level of bacteria.

The present LVSi-RD system has an imaging volume of ~5 μL, allowing imaging of sufficient numbers of bacterial cells simultaneously in urine samples at clinically relevant concentrations. However, when the bacterial concentration is below 1,000 cells/mL and less than 5 cells can be detected, the current classification protocol does not accurately detect bacterial infections. However, this bacterial concentration is likely an appropriate level for detection accuracies to decrease, since the clinical value of these levels is unclear. Each sample underwent initial on-site microbiological plating validation with overnight culturing after the samples were transported to the testing site. Among the eight false negative samples, one sample tested negative with the initial on-site plating validation. It is likely due to the viability lost during the cold storage and transportation, which could be avoided when evaluated on-site with fresh urine. Another five of the remaining seven samples were validated on-site with concentrations between $10^4$-$10^5$ CFU/mL, while the remaining two false negative samples displayed bacterial concentrations higher than $10^5$ CFU/mL. After all sample handling, including prewarming, filtration, and dilution steps, parallel microbiological plating validation results revealed low counts of bacterial cells (below 1,000 cells/mL) for five of the false negative samples. Therefore, most of the false negative results were due to a combination of low initial bacterial concentration and sample handing procedures, such as filtration or dilution. We anticipate the rate of false negative results can be reduced after optimization of the sample handling protocol.

The current sample handling protocol is outlined here: Clinical samples are collected, refrigerated for 12-24 hours, and transported on ice to the research lab. To mimic a fresh and warm urine sample, a 30-minute prewarming incubation at 37° C. was performed prior to testing. Next, to remove large particles, the sample was filtered, and then diluted with microbiological media. To enable single particle tracking, a quick check of total particle concentration was performed in LSVi after the initial 10× dilution of the sample. Additional dilutions of the sample were carried out to achieve a concentration of ~5×$10^4$ particles/mL. These simple steps averaged ~2 minutes for each sample. Then, the sample was subjected to LVSi for 30 second video detection. The final tracking of multi-phenotypic features and SVM clustering with a trained model took ~5 minutes. Therefore, the current total assay time for LVSi-RD of a clinical sample includes 30 minutes sample pre-warming, 2 minutes sample pre-treatment (filtration/dilution), 30 seconds LVSi detection, and 5 minutes multi-phenotypic features tracking and SVM clustering for a total of 37.5 minutes. Ultimately, in a point-of-care setting, the prewarming step would not be necessary for fresh urine samples and the sample pre-treatment time could be reduced with an improved sample collection device that integrates a filter. Thus, the total time for LVSi-RD method of infection determination can be as short as ~5-6 minutes.

Conclusion

We demonstrated that a time-lapse large-volume solution scattering imaging system can be used for rapid UTI detection in clinical samples via label-free tracking of multiple phenotypic features. By real-time tracking of local motion, intensity, and intensity fluctuation of individual bacteria and particles in solution, different particles (including cells and polystyrene beads), bacterial cells with different shapes, and bacterial cells and urine particles can be distinguished and classified with a simple machine learning algorithm. By applying the classification model to 104 clinical urine samples, the model accurately predicted 92.3% of the clinically identified infection-positive samples containing rod-shaped bacterial cells including E. coli, K. pneumoniae, and Gram-negative bacilli, which dominate UTI pathogens. In summary, LVSi-RD can test clinical urine samples without overnight culturing and detect rod-shaped bacterial cells in a total assay time of less than 10 minutes.

Materials and Methods

Materials. E. coli ATCC 25922, S. saprophyticus ATCC 15305, and K. pneumoniae ATCC 25955 were purchased from American Type Culture Collection (ATCC) and stored at −80° C. in 5% glycerol. Polystyrene beads (1 μm) were purchased from Bangs Laboratories, Inc and suspended in PBS. Pooled, healthy human urine purchased from BioreclamationIVT (Lot number: BRH1311635) was filtered using 5 μm syringe filters.

Sample preparation. E. coli, S. saprophyticus, and K. pneumoniae were grown overnight (~15 hours) in Luria-Bertani (LB) broth (per liter: 10 g peptone 140, 5 g yeast extract, and 5 g sodium chloride) or Mueller Hinton Broth (MHB, per liter: 2.0 g beef infusion solids, 1.5 g starch, and 17.5 g casein hydrolysate) at 37° C. with agitation. E. coli and *S. saprophyticus* cultures were diluted in fresh LB broth or MHB, respectively, to concentrations of ~5×10$^4$ cells/mL. Bacterial suspensions (70 µL) were transferred into a cuvette at 37° C. for imaging. Similarly, pooled, healthy human urine purchased from BioereclamationIVT (Lot number: BRH1311635) was filtered using 5 µm syringe filters and diluted in fresh LB broth to concentrations of ~5×10$^4$ particles/mL. Urine particle suspensions (70 µL) were transferred into a cuvette at 37° C. for imaging.

Clinical urine samples. De-identified excess and residual clinical urine samples were obtained from the clinical microbiology laboratory at Mayo Clinic Hospital, Phoenix, Arizona (Approved by Mayo Clinic Biospecimen Subcommittee BIO00015462). Clinical urine samples were stored at 4° C. and transported in an insulated box with ice packs. Prior to processing, urine samples were pre-warmed for 30 minutes at 37° C. and passed through a 5 µm syringe filter to remove large substances. Each urine sample was then supplemented with LB broth. To enable single particle tracking, a quick check of particle concentration is performed in LSVi after the initial 10× dilution of the sample. Urine samples were further diluted to achieve a concentration of ~5×10$^4$ particles/mL. After mixing, diluted samples (70 µL) were transferred to cuvettes (Uvette, Eppendorf, Germany), and subjected to LVSi. A total of 104 urine samples were tested using LVSi and initial counts were validated with on-site microbiological plating, independent of LVSi testing. Urine samples were prepared and transferred to researchers in a blinded fashion. Upon completion of each experimental batch, the LVSi-RD and parallel plating results were compared with clinical microbiology culture results from the Mayo Clinic Hospital lab.

LVSi. The large volume scattering imaging system (FIG. 5A) consists of an 800 mW, 780 nm infrared (IR) LEDs (M780LP1, Thorlabs, Inc., USA), with collimating and focusing lens and a central blocking aperture to focus a ring-shaped illumination through the sample or the reference cuvettes. Wide-view and deep field depth scattering images were recorded by a CMOS camera (BFS-U3-16S2M-CS, Point Grey Research Inc., Canada) at 65 fps through the variable zoom lenses (NAVITAR 12X, Navitar, USA) with zoom factors set at 2.0× for the sample cuvettes. The image volume was determined by the viewing size and focal depth of the optics. For the experiments described in this study, the viewing volume of 2.5 mm×1.9 mm×1.0 mm was equivalent to 4.8 µL at 2.0× magnifying power. The imaging system was enclosed in a thermally isolated housing unit with a controlled temperature (37° C.).

Biosafety. All sample preparations and measurements were performed in biosafety level 2 (BSL2) laboratories following an IBC-approved BSL2 protocol.

Single particle tracking. Individual cells recorded by LVSi are resolved as bright spots, and the image sequences were taken as stacks and analyzed by ImageJ plug-in TrackMate. First, each spot was detected with a Laplacian of Gaussian (LoG) filter with a defined radius and threshold. Then, the spots from adjacent time frames were connected with a Karman filter for directional linking, so that each bright spot became a single-cell trajectory with both intensity and x, y position information at each frame.

Support Vector Machines (SVM). For each single particle trajectory, we extracted a set of handcrafted features based on intensity and position information. Starting with the intensity features, we obtained the statistic features over 30 seconds. Statistic features, including mean, standard deviation, normalized intensity standard deviation (NISD), kurtosis, skewness, quartiles, and motion features, including local mean displacement, MSD, kurtosis, skewness, were extracted. SVM were utilized for their ability to find optimal separation hyperplanes in binary classification, with radial basis function (RBF) kernels. A list with all 10 features were tested, among which NISD of the intensity and MSD of the local displacement provided the most accurate classification results. Therefore, these two features were used in this example for LVSi-RD.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or computer readable media or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method of detecting a target microorganism in a liquid sample using a computer, the method comprising:
   extracting, by the computer, two or more image features for each of a plurality of objects in the liquid sample from a set of imaging data that comprises multiple images of the liquid sample generated at different time points, which image features comprise at least a time profile of object light scattering intensity and at least a time profile of object position to produce a set of extracted image feature data;
   identifying, by the computer, one or more patterns in the set of extracted image feature data to produce one or more sets of identified patterns; and,
   differentiating, by the computer, at least one microorganism from other objects in the plurality of objects in the liquid sample using a threshold value to differentiate the target microorganism from the other objects in the plurality of objects in the liquid sample based upon the one or more sets of identified patterns, and determining the threshold value using a ratio of a number of the target microorganisms in the liquid sample to a total number of objects in the plurality of objects in the liquid sample ($N_{Target}/N_{Total}$) as a predictor, thereby detecting the target microorganism in the liquid sample.

2. The method of claim 1, further comprising determining a tracking trajectory of each of the plurality of objects in the liquid sample from the set of imaging data that comprises the multiple images of the liquid sample generated at the different time points to produce a set of tracking trajectory data and extracting the image features for each of the plurality of objects in the liquid sample from the set of tracking trajectory data to produce the set of extracted image feature data.

3. The method of claim 1, wherein the multiple images of the liquid sample generated at the different time points are magnified about 5 or fewer times.

4. The method of claim 1, wherein a video comprises the multiple images of the liquid sample generated at the different time points and wherein the video is about 30 seconds or less in duration.

5. The method of claim 1, wherein the time profile of object light scattering intensity comprises a map of light scattering intensity fluctuation of a given object in the plurality of objects, or wherein the time profile of object position comprises a map of movement of a given object in the plurality of objects along at least one axis.

6. The method of claim 1, comprising correlating the time profile of object light scattering intensity and the time profile of object position of a given object in the plurality of objects with one or more intrinsic features of the given object in the plurality of objects.

7. The method of claim 6, comprising using the intrinsic features of the given object in the plurality of objects to differentiate the target microorganism from the other objects in the plurality of objects.

8. The method of claim 1, comprising differentiating the target microorganism from other objects in the plurality of objects in the liquid sample based upon the one or more sets of identified patterns using a trained classifier.

9. The method of claim 1, comprising obtaining the liquid sample from a subject.

10. The method of claim 9, wherein the liquid sample obtained from the subject is uncultured prior to extracting the image features for each of the plurality of objects in the liquid sample from the set of imaging data.

11. The method of claim 9, comprising differentiating the target microorganism from other objects in the plurality of objects in the liquid sample within about 10 minutes of obtaining the liquid sample from the subject.

12. The method of claim 11, wherein differentiating the target microorganism from other objects in the plurality of objects in the liquid sample indicates that the subject has a disease.

13. The method of claim 12, wherein the liquid sample is urine and the disease comprises a urinary tract infection (UTI).

14. The method of claim 12, further comprising administering one or more therapies to the subject to treat the disease.

15. The method of claim 1, wherein the sets of identified patterns are generated using one or more machine learning algorithms.

16. The method of claim 1, wherein the plurality of objects is label-free.

17. The method of claim 1, wherein the target microorganism comprises a bacterium.

18. A method of generating a trained classifier using a computer, the method comprising:
  extracting, by the computer, two or more image features for each of a plurality of objects in a plurality of reference liquid samples that comprise a target microorganism from sets of imaging data that comprise multiple images of each of the plurality of reference liquid samples generated at different time points, which image features comprise at least a time profile of object light scattering intensity and at least a time profile of object position to produce a set of extracted image feature data;
  identifying, by the computer, one or more patterns in the set of extracted image feature data to produce one or more sets of identified patterns;
  differentiating at least one microorganism from other objects in the plurality of objects in the plurality of reference liquid samples using a threshold value to differentiate the target microorganism from the other objects in the plurality of objects in the plurality of reference liquid samples based upon the one or more sets of identified patterns, and determining the threshold value using a ratio of a number of the target microorganisms in the plurality of reference liquid samples to a total number of objects in the plurality of objects in the plurality of reference liquid samples ($N_{Target}/N_{Total}$) as a predictor; and,
  training, by the computer, a machine learning algorithm using at least a portion of the sets of identified patterns to create at least one trained classifier that is configured to classify one or more test liquid samples as comprising the target microorganism, thereby generating the trained classifier.

19. An imaging device, comprising:
at least one light source;
at least one liquid sample analysis area in communication with the light source;
at least one camera in communication with the liquid sample analysis area;
at least one controller operably connected at least to the light source and the camera, which controller comprises, or is capable of accessing, computer readable media comprising non-transitory computer executable instructions which, when executed by at least one electronic processor, perform at least:
  extracting two or more image features for each of a plurality of objects in a liquid sample from a set of imaging data that comprises multiple images of the liquid sample generated at different time points, which image features comprise at least a time profile of object light scattering intensity and at least a time profile of object position to produce a set of extracted image feature data;
  identifying one or more patterns in the set of extracted image feature data to produce one or more sets of identified patterns; and,
  differentiating at least one pathogenic microorganism indicative of a disease in a subject from other objects in the plurality of objects in the liquid sample using a threshold value to differentiate a target microorganism from the other objects in the plurality of objects in the liquid sample based upon the one or more sets of identified patterns, and determining the threshold value using a ratio of a number of the target microorganisms in the liquid sample to a total number of objects in the plurality of objects in the liquid sample ($N_{Target}/N_{Total}$) as a predictor using a trained classifier.

* * * * *